United States Patent [19]

Nelson et al.

[11] Patent Number: 5,523,897
[45] Date of Patent: Jun. 4, 1996

[54] TAPE DUPLICATING SYSTEM

[75] Inventors: Alfred M. Nelson, Redondo Beach; Robert P. Adams, Santa Monica, both of Calif.

[73] Assignee: Hightree Media Corporation, El Segundo, Calif.

[21] Appl. No.: 26,697

[22] Filed: Mar. 5, 1993

[51] Int. Cl.$^6$ ................................................. G11B 5/86
[52] U.S. Cl. .................................... 360/16; 360/130.31
[58] Field of Search ........................... 360/15, 16, 130.3, 360/130.31, 130.32; 242/199, 200

[56] References Cited

U.S. PATENT DOCUMENTS

| | | | |
|---|---|---|---|
| 2,742,284 | 4/1956 | Munroe | 360/130.31 X |
| 2,926,219 | 2/1960 | Hollmann | 360/17 |
| 3,476,885 | 11/1969 | Shiber et al. | 360/17 X |
| 4,101,939 | 7/1978 | Hanai | 360/16 |
| 4,104,685 | 8/1978 | Chang | 360/71 X |
| 4,320,879 | 3/1982 | Saitou et al. | 242/189 |
| 4,979,691 | 12/1990 | Kobayashi | 360/17 X |

FOREIGN PATENT DOCUMENTS 0268390  5/1988  European Pat. Off. .

OTHER PUBLICATIONS

Patent Abstracts of Japan vol. 7, No. 202 (P–221) 7 Sep. 1983 of JP,A,58 100 233 (Matsushita Denki Sangyo K.K.) 14 Jun. 1983.

Patent Abstracts of Japan vol. 1, No. 145 (E–067) 25 Nov. 1977 of JP,A,52 083 219 (Matsushita Denki Sangyo K.K.) 12 Jul. 1977.

*Primary Examiner*—Andrew L. Sniezek
*Attorney, Agent, or Firm*—Ellsworth R. Roston; Charles H. Schwartz

[57] ABSTRACT

Master and slave tapes respectively move on a pinch roller from a first supply reel to a first take-up reel in a first cassette and on a capstan from a second supply reel to a second take-up reel in a second cassette. The pinch roller locked in a first position abuts the capstan to transfer to the slave tape the image on the master tape. After such transfer, a signal sensing the slave tape end causes the pinch roller to be unlocked and to be moved to a second position displaced from the first position. In this position, the second cassette is replaceable by another cassette for an image transfer from the master tape. The rotations of the supply reel produce eccentricities which vary tape tension. These tension variations are compensated at positions before the pinch roller and the capstan by springs guiding the tapes and by damping members attached to the springs. The damping members are pre-stressed to provide damped compliances in accordance with the tension variations. Stiffeners are attached to the spring ends. The capstan may be hollow and non-magnetic to receive a magnetic head. A constant amplitude alternating signal applied to the head erases any image on the slave tape by providing a magnetic field greater than the the slave tape coercivity but less than the master tape coercivity. Thus, the image on the master tape is transferred to the slave tape by the abutting tape relationships.

11 Claims, 8 Drawing Sheets

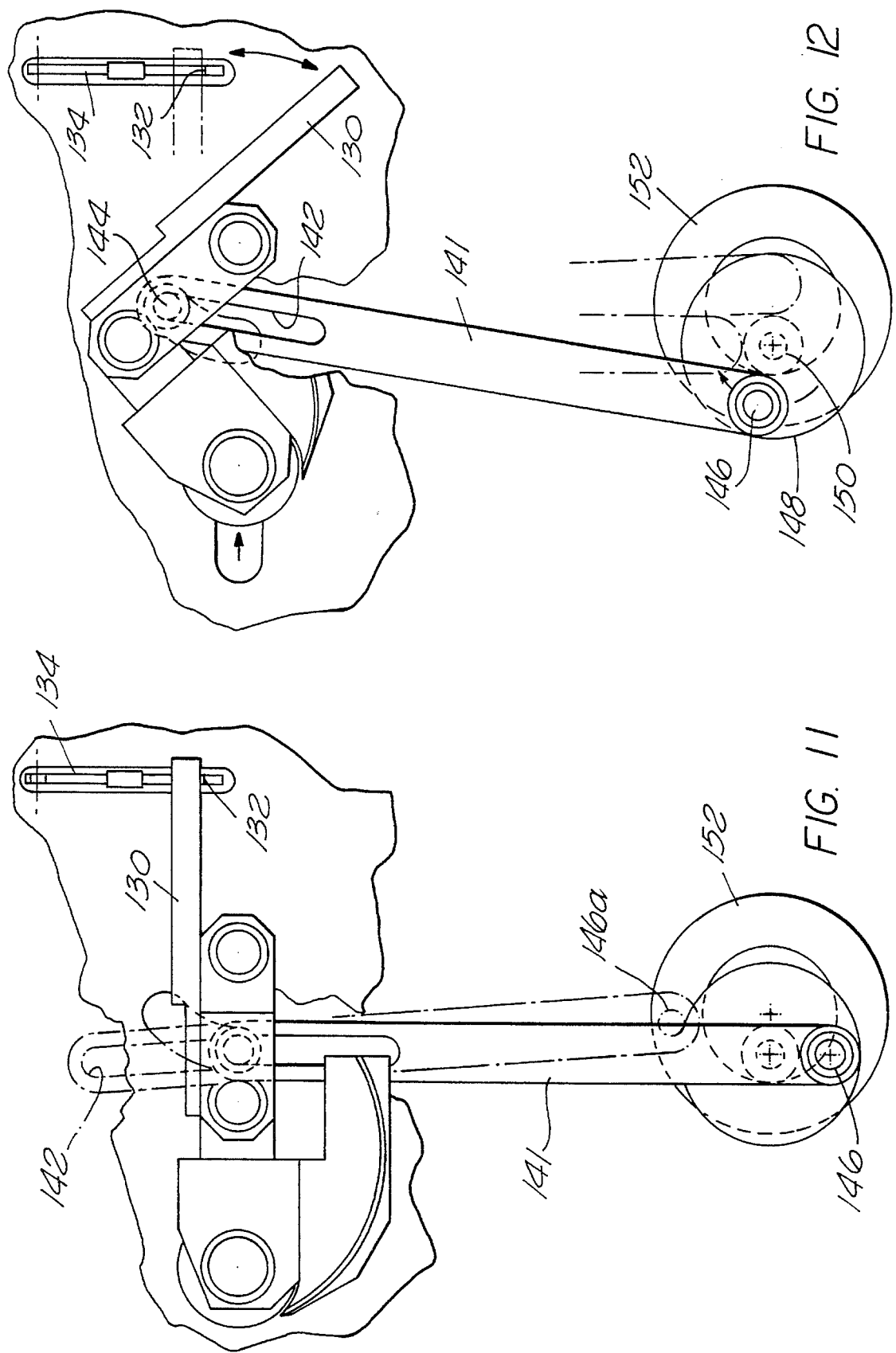

TAPE DUPLICATING SYSTEM

This invention relates to apparatus for, and methods of, transferring visual and audio information on a master tape to a slave tape. More particularly, this invention relates to apparatus for, and methods of, transferring visual and audio information on a master tape to a slave tape with a substantially constant tension on the tapes and for decoupling the tapes immediately after the transfer has been completed.

Visual and audio information is often stored on a tape for playback at a subsequent time. For example, visual and audio information relating to popular motion pictures is stored on tapes. These tapes are rented or sold at neighborhood stores. A popular movie such as "Aladdin" or a movie winning an Academy Award has millions of taped copies distributed to satisfy the demands of purchasers and renters. Substantially all of these taped copies have to be made available at a pre-selected release date in order to satisfy the pent-up demand of viewers for such taped copies. Although the demand for movie rentals and sales is great, it still seems to be increasing significantly from year to year.

Visual and audio information on tapes is not only provided in the form of movies for entertainment. It is also provided in large volume for business purposes. For example, large corporations deliver messages in the form of tapes to their sales personnel to acquaint such sales personnel with the construction, operation and advantages of new products. Since large corporations employ large numbers of sales personnel, many copies of such messages have to be prepared for distribution to such sales personnel.

The visual and audio information on most tapes is in magnetic form. One reason is that information in magnetic form can be relatively easily and inexpensively reproduced. For example, most reproducing apparatus in the home use magnetic heads to read the information recorded magnetically on the tapes when the tapes are inserted into such apparatus. Another reason is that tapes with information recorded in magnetic form are less expensive to reproduce than tapes in other forms such as in optical form.

One type of tape for recording information in magnetic form has a thermomagnetic layer on the tape. The thermomagnetic layer may be formed from a suitable material such as chromium dioxide. The thermomagnetic layer has a Curie temperature at or above which any magnetic information on the tape is destroyed and below which magnetic information can be recorded on the tape. Thermomagnetic tape is advantageous because information can be recorded on the thermomagnetic tape at a temperature at or somewhat below the Curie temperature by pressing a master tape against the thermomagnetic layer on the slave tape at such a temperature. This causes the surface of the thermomagnetic layer to become cooled to a temperature below the Curie temperature by contact with the cool surface of the master tape. As the thermomagnetic layer cools to a temperature below the Curie temperature, the magnetic information on the magnetic tape becomes transferred to the thermomagnetic layer on the slave tape. The information on the master tape thus becomes transferred in mirror form to the thermomagnetic layer on the slave tape without having to use any magnetic heads to write information on the slave tape.

There is at least one apparatus now in use for transferring information in magnetic form on a master tape to a thermomagnetic layer on a slave tape. Although this apparatus is fast, it is large, cumbersome and expensive, and requires excessive electrical power.

With the millions of copies that have to be made of a single movie such as the movie winning an Academy Award, it would be desirable to provide apparatus which is relatively inexpensive and which transfers information from a master tape to a slave tape in a minimal period of time. For example, it would be desirable to provide economical equipment which reproduces a two (2) hour movie in approximately thirty (30) to sixty (60) seconds without any need for using magnetic reproducing heads. Because of the desire, and actually the need, for such apparatus, a considerable effort has been devoted, and a significant amount of money has been expended, to develop apparatus which meet such criteria. In spite of such effort and such money expenditure, no satisfactory apparatus meeting such criteria has been provided to this date.

The invention disclosed and claimed in application Ser. No. 07/733,174 filed by us on Jul. 19, 1991 abandoned for a "Tape Duplicating System" and assigned by us to the assignee of record in this application provides apparatus which more than meets the criteria specified in the previous paragraph. It is able to record a two (2) hour movie in approximately thirty (3) to sixty (60) seconds such that the duplicated copy has the visual and audio fidelity of the original or master copy. It is compact so that it occupies relatively little space. This is important when a large number of apparatuses are used simultaneously in an enclosure such as a room to make duplicate copies. For example, the apparatus can be used to transfer the information on a master-master tape to a master tape, and subsequently the same apparatus can be used to transfer the information on the master tape to a slave tape, all without using recording heads.

In one embodiment of the invention disclosed and claimed in application Ser. No. 07/733,174, a master tape moves between first supply and take-up reels over a pinch roller. A slave tape moves between second supply and take-up reels over a capstan. First and second guides can be respectively constructed and adjustably positioned to regulate the movement of the master and slave tapes to aligned positions on the pinch roller and the capstan. A heater disposed between the capstan and the second guide heats only a thermomagnetic layer on the slave tape to at least the Curie temperature. The heater is adjustable in position to facilitate the movement of the slave tape to the aligned position on the capstan. A brake shoe between the capstan and the second supply reel controls the tension of the slave tape and damps any variations in the tension of the slave tape. A brake shoe between the pinch roller and the first supply reel controls the tension of the master tape and damps any variations in the tension of the master tape.

The pinch roller is movable to a first position, locked in position relative to the capstan, in which it abuts the capstan to facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the master tape on the pinch roller and the slave tape on the capstan. The heater is pivotable relative to the capstan to facilitate the disposition of the slave tape on the capstan. The capstan, preferably of a unitary construction, receives forces to maintain the rotational axis of the capstan substantially constant.

Since the tapes pass over surfaces between the brake shoes and the capstan and the pinch roller, the tensions on the master and slave tapes are not as closely regulated at the position of transfer of the magnetic information from the master tape to the slave tape as might otherwise be desired. Specifically, the tapes pass over alignment guides which have a variable friction with time and physical conditions. This variable friction inhibits a precise regulation of the tape tensions at the abutting positions between the capstan and the pinch roller where the magnetic information is transferred to the slave tape.

In one embodiment of the invention disclosed and claimed by us in application Ser. No. 07/886,688 filed by us on May 19, 1992, U.S. Pat. No. 5,392,976 for a "Servo System" and assigned by us of record to the assignee of record of this application, a master tape movable in a closed loop including a pinch roller transfers a mirror image to a slave tape movable in a closed loop including a capstan. A thermomagnetic layer on the slave tape has a Curie temperature above which magnetic information is destroyed and below which magnetic information can be recorded on such layer. The thermomagnetic layer is heated above the Curie temperature and is accordingly lengthened by thermal expansion just before the slave tape reaches the capstan.

A first guide contiguous to the heater regulates the tension of the slave tape. A downstream portion of a peripheral surface, preferably defining a cylindrical segment, on the guide receives a pressurized fluid for sensing the tape tension in accordance with the tape width, the spacing from the axis of the peripheral surface and the fluid pressure. An upstream portion of the peripheral surface receives a vacuum adjustable to vary the spacing between the slave tape and the downstream portion. This regulates the tape tension.

The master tape is lengthened by a second guide having the same construction as the first guide to compensate for the lengthening of the slave tape by the heater and the first guide, thereby producing a true mirror image on the slave tape after the slave tape has cooled to the ambient temperature. Each of the master tape and the slave tape has a particular product of the Youngs modulus, tape width and tape thickness to provide a controlled strain on the tape when the tension on the tape is regulated.

The invention disclosed and claimed in application Ser. No. 07/886,688 provides apparatus for, and methods of, regulating the tension of a master tape at a position contiguous to a pinch roller and for regulating the tension of a slave tape at a position contiguous to a heater, which is in turn contiguous to a capstan. The apparatus and method of application Ser. No. 07/886,688 are adapted to be used in the apparatus and method of co-pending application Ser. No. 07/733,174 and to constitute an improvement in the apparatus and method of co-pending application Ser. No. 07/733,174. Co-pending application Ser. No. 07/733,174 also provides a master tape and a slave tape which may be constructed especially for the apparatus and method of the invention disclosed in such application to obtain all of the advantages provided by the apparatus and method of such application.

In one embodiment of the invention disclosed and claimed in this application, a master tape moves from a first supply reel to a first take-up reel in a first cassette. A slave tape moves from second supply reel to a second take-up reels in a second cassette. A pinch roller locked in a first position between the first supply and take-up reels abuts a capstan between the second supply and take-up reels to transfer to the slave tape the image on the master tape. At the end of such transfer, a signal sensing the completion of the transfer causes the pinch roller to be unlocked and to be moved to a second position displaced from the first position. In this position, the second cassette is replaceable by another cassette for an image transfer from the master tape.

The rotations of the supply reels produce eccentricities which vary the tensions of the tapes as the supply reels rotate. These tension variations are compensated at positions before the pinch roller and the capstan by springs guiding the tapes and by damping members attached to the springs. The damping members are pre-stressed to provide damped compliances in accordance with the tension variations. Stiffeners are attached to the spring ends to provide for the compliances by the springs.

The capstan may be hollow and non-magnetic to receive a magnetic head within the capstan. A constant amplitude alternating signal applied to the head results in initially rising and then decaying amplitudes to each point on the moving tapes as the tapes move toward and away from the head gap, thereby erasing any image on the slave tape but not erasing any image on the master tape by providing a magnetic field greater than the coercivity of the slave tape but less than the coercivity of the master tape. Thus, the image on the master tape is transferred to the slave tape by the abutting tape relationship.

IN THE DRAWINGS

FIG. 11 is a fragmentary plan view of members for moving the pinch roller and the associated guide between the first and second positions, and illustrates these members in full lines in a first position, and in broken lines in a second position, for positioning the pinch roller and the associated guide in the first relationship;

FIG. 12 is a fragmentary plan view of the members shown in FIG. 11 and illustrates these members in a third position, for positioning the pinch roller and the associated guide in the second relationship;

Figure 16:
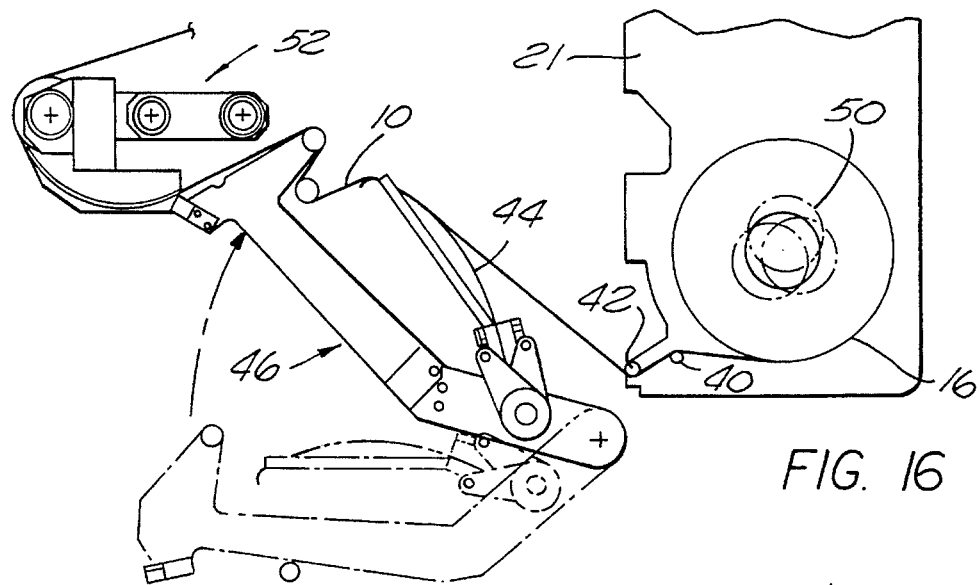
Figure 17:
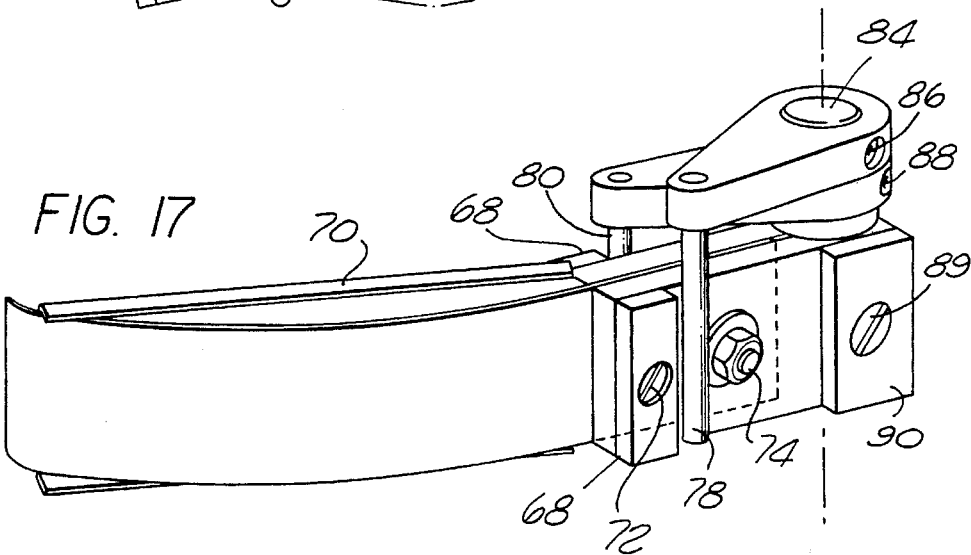
Figure 18:
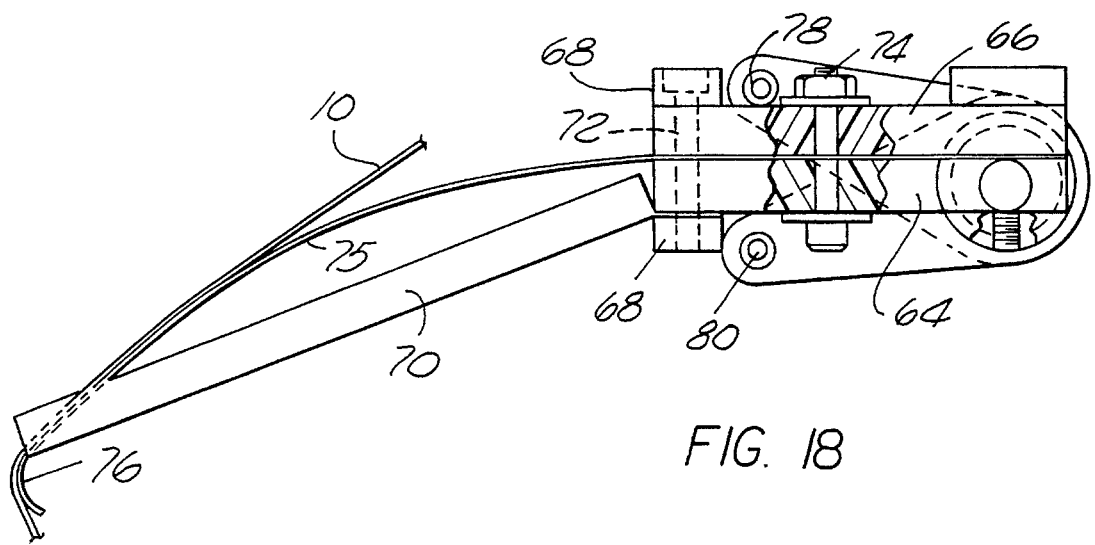
Figure 19:
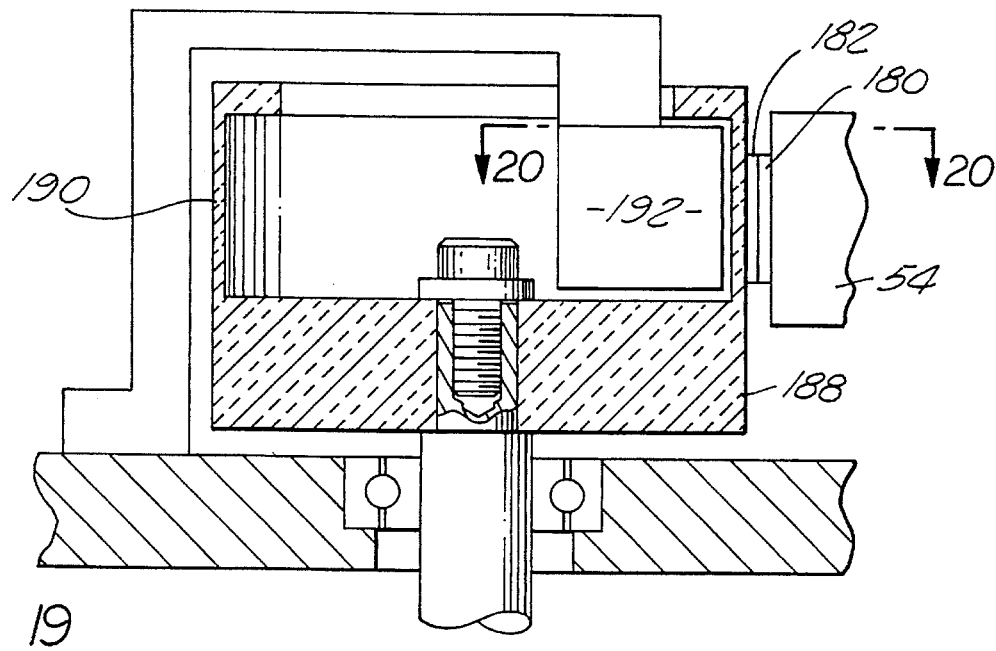
Figure 20:
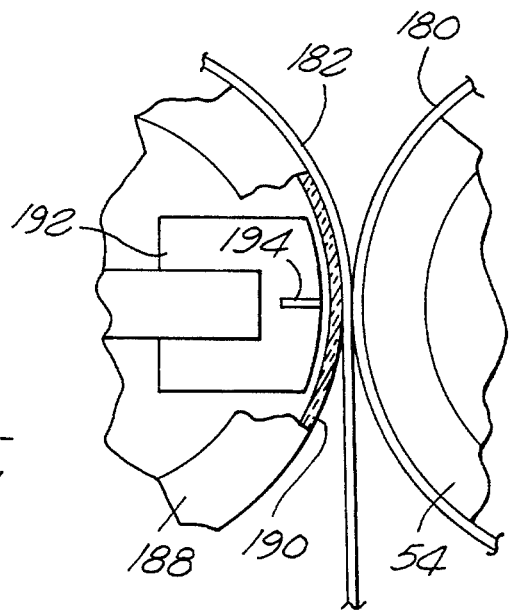
Figure 21:
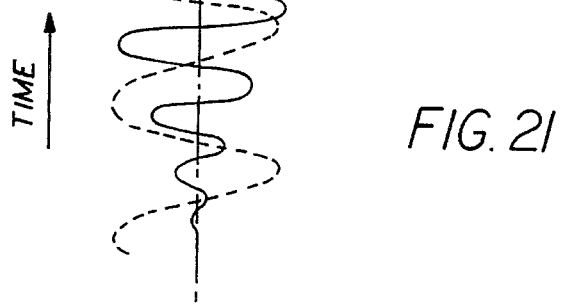

FIG. 16 is a schematic plan view of a supply reel in a cassette for the master tape and of eccentricities in the supply reel during rotation and of apparatus for compensating for the eccentricities in the supply reel during the rotation of the supply reel to maintain the tension of the master tape at a substantially constant value, FIG. 17 is an enlarged perspective view of the compensating apparatus shown in FIG. 16 and illustrates the construction of the apparatus in additional detail;

FIG. 18 is an enlarged plan view of the compensating apparatus shown in FIGS. 16 and 17 with certain components broken away to show other components in additional detail and illustrates the construction of such compensating apparatus in further detail;

FIG. 19 is an enlarged elevational view, partially in section, of an alternative embodiment of a capstan for use in the system shown in the previous figures and also shows a magnetic head inside the capstan for erasing any previous image on the slave tape before the image on the master tape is transferred to the slave tape;

FIG. 20 is a sectional view taken substantially on the line 20—20 of FIG. 19 and illustrates the construction of the capstan and the head in additional detail, and FIG. 21 is a schematic diagram illustrating the relative coercivities of the master and slave tapes for use with the embodiment shown in FIGS. 19 and 20.

Basic aspects of the system constituting this invention are disclosed and claimed in application Ser. No. 07/733,174 filed by Alfred M. Nelson and Robert P. Adams on Jul. 19, 1991, for a "Tape Duplicating System" and assigned of record to the assignee of record of this application. Improvements in this system are disclosed and claimed in application Ser. No. 07/886,688 filed by Alfred M. Nelson and Robert P. Adams on May 19, 1992 for a "Tape Duplicating System", and assigned of record to the assignee of record of this application. If any additional information should be needed to complete the disclosure of the invention disclosed and claimed in this application, applicants intend to have such co-pending applications complete the disclosure. This is particularly true since applicants provide only a limited disclosure in this application of some of the features common to the co-pending applications.

In one embodiment of the invention generally indicated at 11, a master tape 10 (FIG. 1) is provided with a mirror image of information such as visual pictures and aural sound to be reproduced on a slave tape 12. Preferably the mirror image of the visual and aural information is recorded in magnetic form on the master tape 10. The mirror image may be recorded in either analog or digital form. The visual and aural information may be provided in a layer of a magnetizable oxide such as an iron oxide on the surface of the master tape. The magnetizable oxide may be formed in a conventional manner on the master tape 10.

The slave tape 12 (FIG. 1) preferably has a thermomagnetic layer on the tape. The thermomagnetic layer may be formed on the slave tape 12 from a suitable material such as chromium dioxide in a manner well known in the art. The thermomagnetic layer preferably has a Curie temperature above which magnetic information in the thermomagnetic layer is destroyed and below which the magnetic information on the master tape can be duplicated in the mirror image on the thermomagnetic layer 14 on the slave tape by contact between the master and slave tapes. Preferably the duplication occurs at a temperature close to the Curie temperature. When this occurs, the duplication can occur by pressing the master and slave tapes together and can occur without any need to provide magnetic heads for transferring the magnetic information from the master tape 10 to the slave tape 12. It will be appreciated that the magnetic layer on the master tape 10 may also be formed from a thermomagnetic material.

Figure 1:
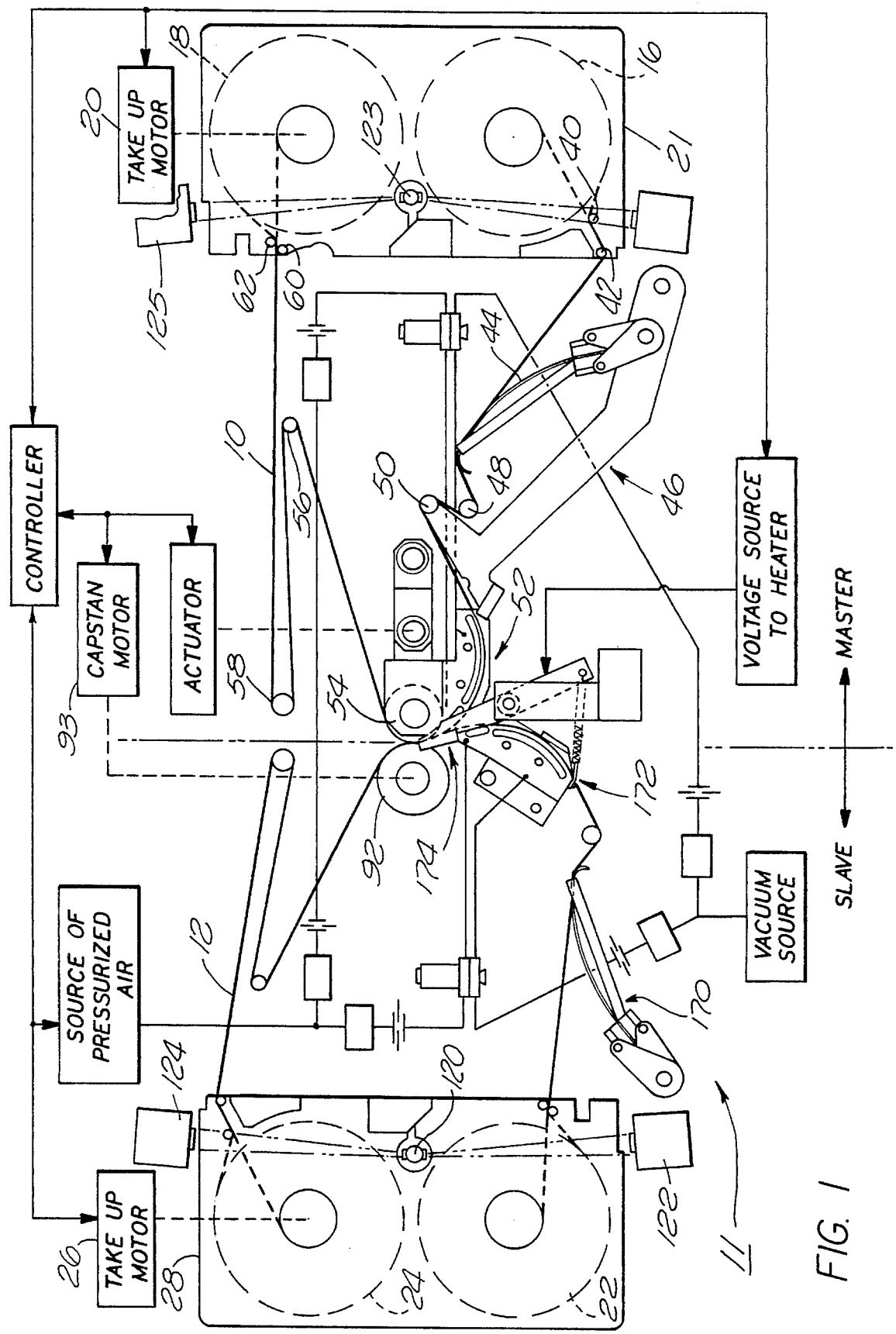
FIG. 1 is a schematic plan view, partly in block form, of one embodiment of apparatus for transferring the image, preferably in magnetic form, on a master tape to a slave tape in a mirrored relationship.

The master tape 10 can be initially wound on a supply reel 16 and can then be unwound from the supply reel 16 and wound on a take-up reel 18. The unwinding of the master tape 10 from the supply reel 16 can be provided by a capstan motor 13 (FIG. 1) and the winding of the master tape on the take-up 18 can occur through the operation of a take-up motor 20 (FIG. 1). The reels 16 and 18 and the take-up motor 20 can be constructed in a conventional manner as in a video cassette 21 found in many homes. Similarly, a supply reel 22, a take-up reel 24 and a take-up motor 26 can be provided in a video cassette 28 for the slave tape 12. The cassettes 21 and 28 can be those used in video cassette recorders (VCR) for some time available for recording and playing TV programs and playing prerecorded tapes.

The arrangement shown in FIG. 1 can actually be disposed in an actual embodiment in a form inverted from that shown in FIG. 1. As shown in FIG. 1, the master tape 10 from the supply reel 16 extends around guide pins 40 and 42 (FIGS. 1 and 16) in the cassette 21 to a spring 44 in tensioning apparatus generally indicated at 46. The master tape then extends around pins 48 and 50 to a guide generally indicated at 52. The tape 10 then extends partially around a pinch roller 54 to pins 56 and 58 and then between a pair of pins 62 and 60 in the cassette 21 to the take-up reel 18 in the cassette.

The supply reel 16 for the master tape 10 has eccentricities (indicated schematically in broken lines at 50 in FIG. 16) which cause the supply reel to wobble as it rotates. The wobbling of the supply reel 16 causes the master tape 10 to be delivered at a variable speed. This variation in speed causes the tension of the master tape 10 to vary as the tape becomes unwound from the supply reel 16 by the rotation of the supply reel. FIGS. 16, 17 and 18 schematically illustrate the construction of the apparatus 46 for compensating for the variations in the tension of the master tape 10 as a result of the eccentricities 50 in the supply reel 16 during the rotation of the supply reel. The apparatus 46 for the master tape 10 modifies the path of the master tape 10, and therefore the distance of movement of the master tape 10, on a damped basis to modify the tension of the master tape. The apparatus 46 is shown in an operative position in full lines in FIG. 16 and in a withdrawn position in broken lines in that Figure.

The apparatus 46 shown in FIGS. 16, 17 and 18 includes the spring 44 and a pair of damping members 64 and 66 made from a suitable material such as a polyurethane. Polyurethane is advantageous because it has good damping properties to changes in the tension on the master tape 10 and because it has a good memory. This good memory allows the members 64 and 66 to return to their original positions after forces have been imposed upon the damping members. Polyurethane is also advantageous because it does not fatigue.

The damping members 64 and 66 are clamped to the spring 44, to plates 68 and to a stiffener 70 as by screw-and-nut combination 72. The damping members 64 and 66 are also clamped to the spring 44 as by a nut-and-screw combination 74. The spring 44 and the stiffener 70 may be made from a material such as a stainless steel. The spring 44 may be a leaf spring. The spring 44 may have a first portion with a large radius such as indicated at 75 and may have an end portion with a small radius such as indicated at 76. The master tape 10 is disposed on the portion 75 at a position near the portion 76 and is then disposed on the portion 76 adjacent the portion 74. The stiffener 70 engages the spring 44 at its outer end adjacent the juncture between the portions 75 and 76.

Stops 78 and 80 respectively engage the damping members 64 and 66 at positions between the nut-and-screw combinations 72 and 74. The stops 78 and 80 may be rotatable on a positioning member 84 for variable positioning relative to the positioning member. After rotation, the stops 78 and 80 may be fixedly positioned relative to the positioning member 84 as by set screws 86 and 88. The damping members 64 and 66 fit into a notch in the positioning member 84 and are clamped to the positioning member by a plate 90 and screw 89.

The stops 78 and 80 are positioned to pre-stress the damping members 64 and 66 and to limit the excursions of the spring 44 to changes in the tension of the master tape 10. If the damping members 64 and 66 were not pre-stressed, the spring 44 would have a tendency to vibrate upon the start-up of the tape movement and would continue to vibrate for some time thereafter. This would tend to aggravate the modulations in the tension of the tape. By pre-stressing the damping members 64 and 66, the damping members absorb increased amounts of energy. This provides an enhanced damping of the modulations in energy resulting from the variations in the tension of the master tape 10 as the reel 16 rotates through each revolution.

The enhanced damping provided by the pre-stressing of the damping members 64 and 66 inhibits any vibrations of the spring 44. Furthermore, the stiffening member 70 tends to make the spring 44 stiff at the end of the spring receiving the master tape 10 so that any compliance in the compensating apparatus 46 as a result of modulations in the tension of the master tape 10 is provided essentially by the damping members 64 and 66. The operation of the compensating apparatus 46 in minimizing the modulations in the tension of the master tape 10 is especially effective as the radius of the tape remaining on the reel 16 decreases during the transfer of the image on the master tape 10 to the slave tape 12 since the eccentricities produced in each revolution of the tape become progressively pronounced and higher in frequency.

The guide 52 (FIGS. 1–3) is disclosed and claimed in application Ser. No. 07/886,688. It includes a curved periphery 91 which receives a vacuum through apertures at the upstream end of the periphery in the direction of the movement of the master tape 10 and air under pressure at the downstream end of the curved periphery in the direction of the movement of the master tape. The vacuum at the upstream end of the guide 52 is regulated in accordance with the pressure of the air at the downstream end of the guide to maintain the tension of the master tape 10 at a particular value at a position contiguous to the pinch roller 54.

Figure 2:
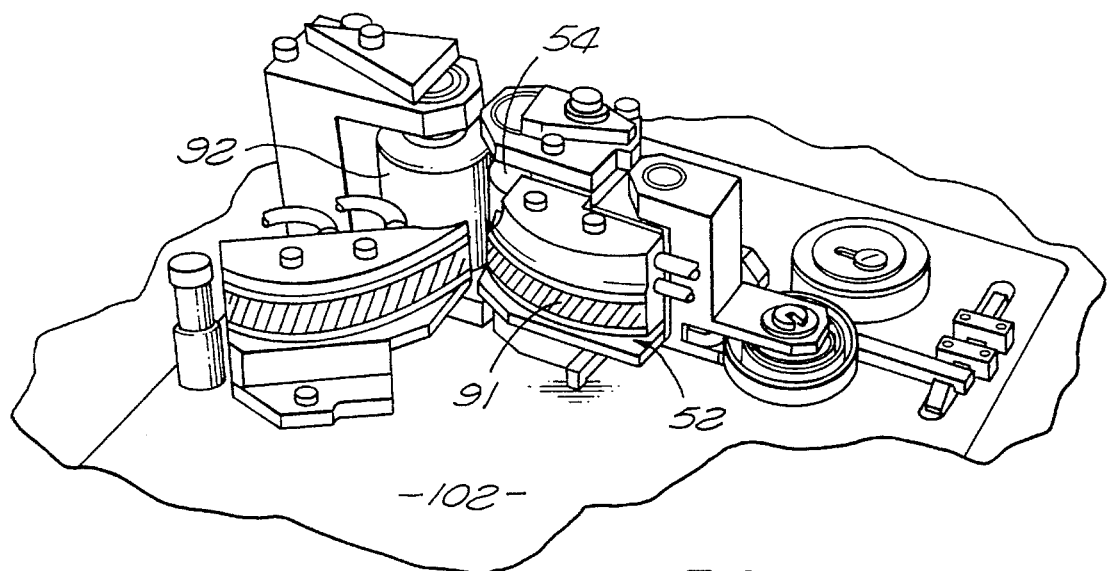
FIG. 2 is an enlarged schematic perspective view as seen from a position above the members, of a capstan and a guide for a slave tape and a pinch roller and a guide for the master tape with the pinch roller and the guide in a first position for transferring to the slave tape the image on the master tape.
Figure 3:
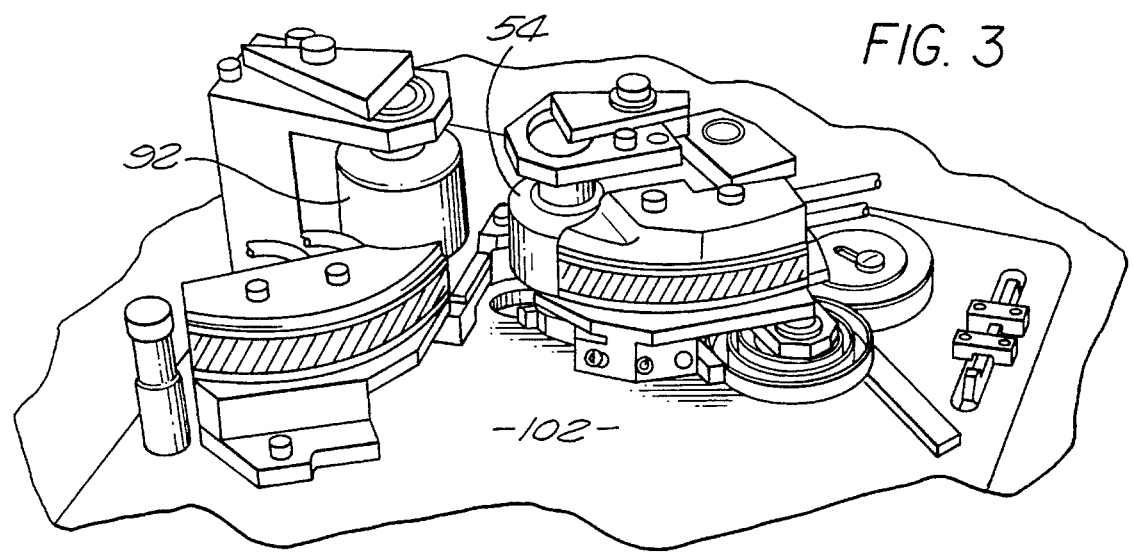
FIG. 3 is an enlarged perspective view similar to that shown in FIG. 2 but with the pinch roller and the guide in a second position in which the pinch roller is displaced from the capstan for facilitating the threading of the slave tape on the capstan and the master tape on the pinch roller.

The guide 52 is coupled to the pinch roller 54 and is movable from a first position to a second position when the pinch roller is movable from a first position to a second position. The disposition of the guide 52 and the pinch roller 54 in the first position is shown in FIG. 2. In this position, the periphery of the pinch roller 54 abuts the periphery of a capstan 92. In the second position, the pinch roller 54 is displaced from the capstan 92 as illustrated in FIG. 3. In this position, the master tape 10 can be threaded on the periphery of the pinch roller 54 and the slave tape 12 can be threaded on the periphery of the capstan 92. After the threading of the master 10 on the pinch roller 54 and the threading of the slave tape 12 on the periphery of the capstan 92, the pinch roller is moved to the position shown in FIG. 2 to provide for a transfer to the slave tape of the image on the master tape. The capstan 92 can be integral with the shaft of a motor 93 (FIG. 1) driving the capstan to increase the stability of the capstan during the rotation of the capstan.

The movement of the pinch roller 54 between the first and second positions is guided by the movement of a bearing 94 (FIG. 4) on the pinch roller assembly in a groove 96 (FIG. 5) in the capstan assembly. The bearing 94 moves into the slot 96 in FIG. 5 to position the pinch roller 54 in the first position. A bridge member 98 in the capstan assembly defines a socket 100 for receiving a lug 101 in the pinch roller assembly to lock the pinch roller 54 in position to abut the capstan 92.

Figure 4:
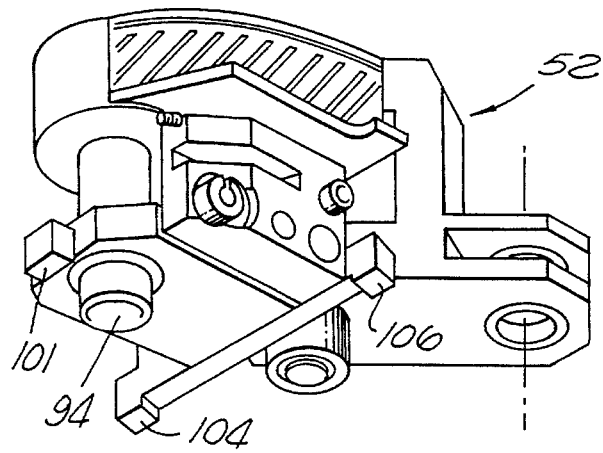
FIG. 4 is a schematic perspective view, as seen from a position below the members, of the pinch roller and the guide in the second position of these members and illustrates additional features in the pinch roller and the guide.
Figure 5:
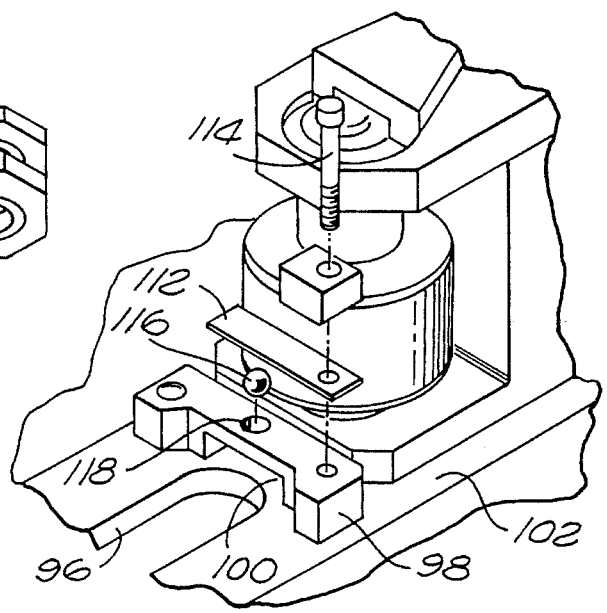
FIG. 5 is a perspective view of the capstan and associated members as seen from a position above these members.
Figure 6:
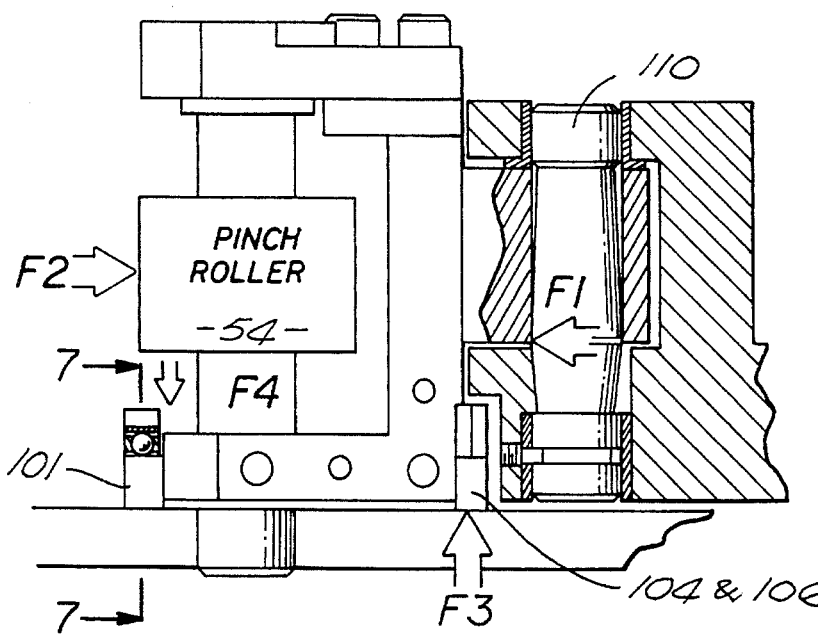
FIG. 6 is an elevational view of the pinch roller and members associated with the pinch roller with certain of the members partially broken away to illustrate their construction in additional detail.

The pinch roller assembly is positioned on a plate 102 (FIGS. 2, 3 and 5) by the lug 101 and a pair of additional lugs 104 and 106 spaced from each other and the lug 101 (FIG. 4). These three lugs define a three (3) point contact for positioning the pinch roller assembly on the plate 102. It will be appreciated that more than three (3) points of contact may be used without departing from the scope of the invention. In FIG. 6, the force of the capstan against the pinch roller 54 is illustrated at F2. The force of the base plate 102 against the pinch roller assembly caused by the force of a spring 112 on the lug 101 is illustrated at F4. The counter force of the pinch roller assembly against the capstan is illustrated at F1. To assure that the pinch roller assembly will be firmly planted on the base plate 102, a tapered pin 110 (FIG. 6 and 8) is provided in the pinch roller assembly. By tapering the pin 110, the pin produces the force F1 in the horizontal direction at a sufficiently low position to assure that the pinch roller assembly will be firmly planted on the base plate 102. This assures that any tendency for a leaf spring 126 (FIGS. 8 and 9) to lift the pinch roller assembly from the base plate 102 will not be successful.

Figure 7:
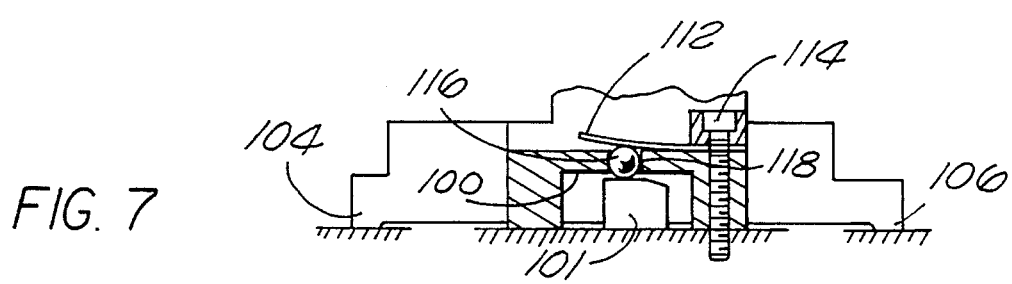
FIG. 7 is a fragmentary sectional view of members included in the pinch roller assembly for facilitating the proper disposition of the pinch roller in abutting relationship to the capstan to obtain an optimal transfer to the slave tape of the image on the master tape.

To help assure that the lug 101 will be retained in the socket 100 with the pinch roller 54 in the first position, a leaf spring 112 (FIGS. 5 and 7) is disposed on the detent 98 and is fastened at one end to the detent as by a threaded bolt 114.

The free end of the leaf spring 112 presses downwardly upon a ball 116 disposed in an aperture 118 in the bridge member 98. The ball 116 in turn presses downwardly upon the lug 101. When the lug 101 is to be moved out of the socket 100, relatively little friction is provided since the ball 116 yields against the action of the leaf spring 112.

The transfer of the movie on the master tape 10 to the slave tape 12 starts with the master tape positioned at the end of the movie. The transfer of the movie to the slave tape 12 continues until the master tape 10 and the slave tape 12 are at the beginning of the movie. It is then desirable to stop the movement of the slave tape 12 quickly so that there will be relatively little footage on the slave tape before the start of the movie. This assures that a viewer will be able to start watching the movie almost immediately after the viewer inserts the slave tape 12 into a VCR reproducer. To provide the slave tape 12 with relatively little footage before the start of the movie, the pinch roller 54 has to move quickly from the first position (FIG. 2) abutting the capstan 92 to the second position (FIG. 3).

When the slave tape 12 reaches the end of the tape (actually the beginning of the movie) during the transfer to the slave tape of the image on the master tape, the tape becomes transparent or at least translucent. This causes an infra-red source 120 (FIG. 1) to pass infra-red energy through the tape to an infra-red detector 122 near the take-up reel 22 in the cassette 28. An infra-red detector 124 may also be disposed near the supply reel 16 to detect breaks in the slave tape 12.

The apparatus shown in FIGS. 8–15 responds to the signal from the infra-red detector 122 (FIG. 1) to obtain a displacement of the pinch roller 54 from the first position shown in FIG. 2 to the second position shown in FIG. 3. This displacement is provided in a matter of milliseconds such as approximately eleven milliseconds (11 ms.). In the second position, the pinch roller 54 is no longer coupled to the capstan 92. As will be appreciated, it is important to decouple the pinch roller 54 from the capstan 92 in as short a time as possible since the slave tape 12 and the master tape 14 are traveling at high rates of speed during the transfer to the slave tape 12 of the image on the master tape. For example, a two (2) hour movie can be transferred by the apparatus of this invention from the master tape 12 to the slave tape 10 in less than forty (40) seconds. An infra-red source 123 and an infra-red detector 125 may also be associated with the master tape 10 in the cassette 21 in a manner similar to the association between the infra-red source 120 and the infra-red detector 122 relative to the master tape 12 in the slave cassette 28. In the claims, the detection is recited as being associated with the movement of the slave tape 10. These claims should be read sufficiently broadly to include the detection from the movement of the master tape 10.

Figure 8:
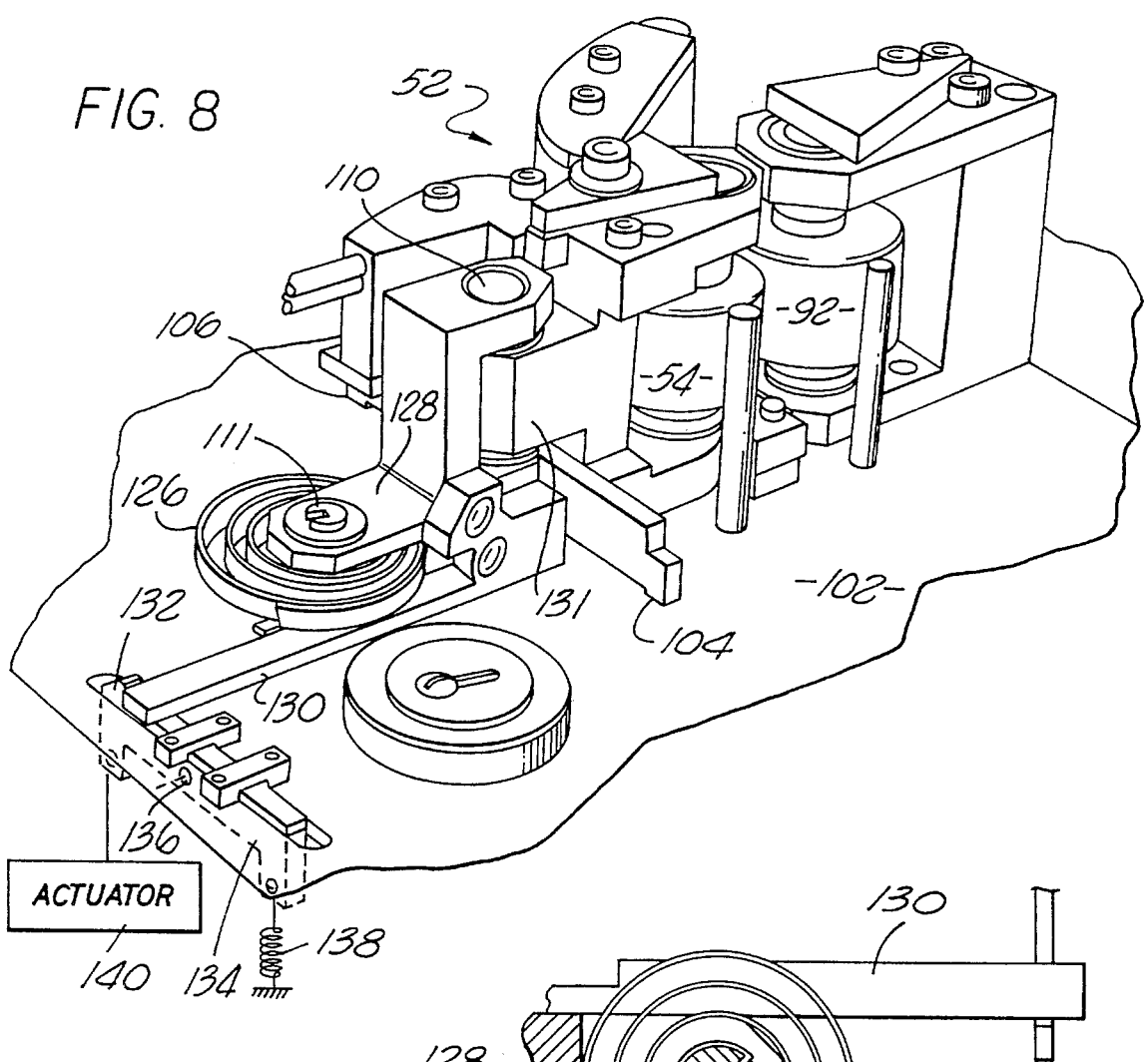
FIG. 8 is an enlarged perspective view, as seen from a position above the members, of the pinch roller and capstan assemblies and of members included in the pinch roller assembly for providing for the movement of the pinch roller and the associated guide between the first and second positions.
Figure 9:
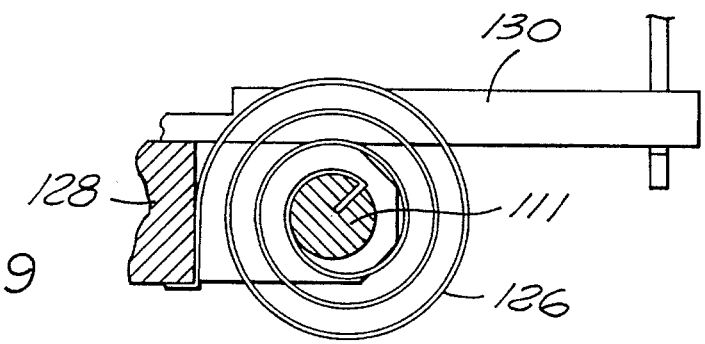
FIG. 9 is an enlarged fragmentary plan view of a helical spring and associated members (also shown in FIG. 8) with the spring in a constrained relationship for holding the pinch roller and the associated guide in the first position, the view being taken substantially on the line 9—9 in FIG. 13.
Figure 10:
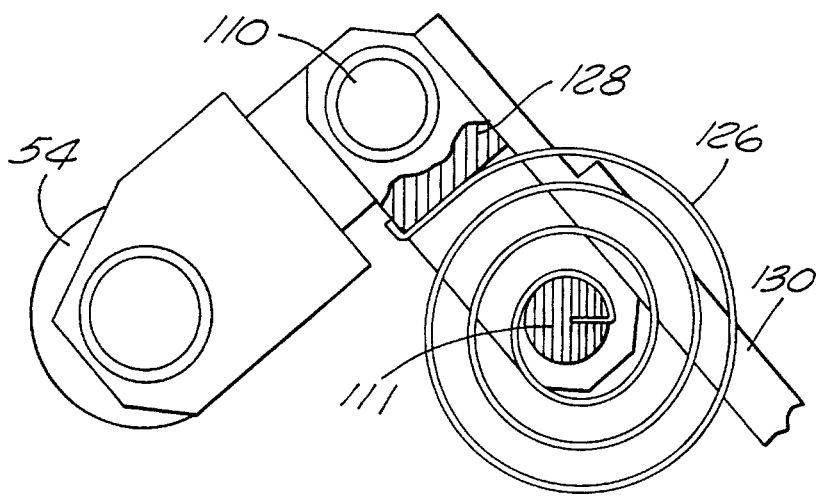
FIG. 10 is an enlarged fragmentary plan view similar to that shown in FIG. 9 but with the constraint of the helical spring released to position the pinch roller and the associated guide in the second relationship.

FIG. 8 shows the pinch roller assembly in the first position such that the pinch roller 54 abuts the capstan 92. In the first position, the helical spring 126 is disposed in a constrained relationship as shown in FIG. 9. The helical spring 126 is attached at its inner end to a pin 111. At its outer end, the spring 126 is attached to a member 128 included in the pinch roller assembly. A rod 130 is coupled to the member 128 for movement with the member 128. In this way, when the constraint on the spring 126 is released as shown in FIG. 10, the spring 126 expands helically to pivot the member 128 and the rod 130 from the position shown in FIG. 9 to the position shown in FIG. 10. Since the member 128 is attached to the pinch roll housing 131 by the shaft 110 (FIG. 2), the pivoting of the member 128 and the rod 130 causes the pinch roll housing 131 to pivot from the first position shown in FIG. 2 to the second position shown in FIG. 3. At the same time, the pinch roller 54 moves along the slot 96 (FIG. 5) from the position shown in FIG. 2 to the position shown in FIG. 3.

Figure 14:
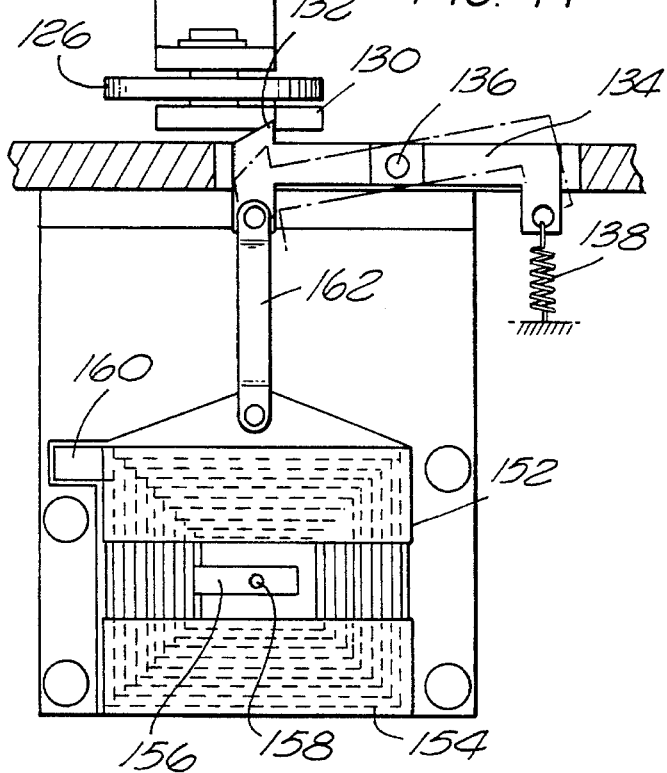
FIG. 14 is an enlarged fragmentary sectional view taken substantially on the line 14—14 of FIG. 13 and illustrates the apparatus of FIG. 13 in further detail with the apparatus being shown in the locking relationship in full lines and in the releasing relationship in interrupted lines of alternately long and short length.

The rod 130 restrains the constraint of the spring 126 as shown in FIG. 9 from being released to the relaxed position of the spring in FIG. 10. As shown in FIGS. 8 and 14, the rod 130 is restrained from any pivotable movement by a pawl 132 at one end of an arm 134 which is pivotable on a pin 136. The arm 134 is pivoted by a spring 138 about the pin 136 as a fulcrum in a clockwise direction so that the pawl 132 engages the rod 130, thereby preventing the rod 130 from pivoting from the position shown in FIG. 9 to the position shown in FIG. 10. However, when the pawl 132 is actuated as by an actuator 140 in FIG. 8, the pawl becomes pivoted in a counterclockwise direction to release the rod 130 so that the rod is able to be moved by the helical spring 126 from the position shown in FIG. 9 to the position shown in FIG. 10.

FIGS. 11 and 12 show schematically the mechanism for moving a rod 141 from the second position shown in FIG. 10 to the first position shown in FIG. 9. As shown in these Figures, the rod 141 includes at one end a slot 142 which receives a pin 144. At its other end, the rod 141 is coupled to a pin 146 on a disc crank 148. The disc crank 148 is driven by a shaft 150 coupled as by gears (not shown) to a motor 152.

FIG. 12 shows the rod 141 and the pinch roller assembly in a position corresponding to that shown in FIG. 10. When the motor 152 operates to drive the disc crank 148 in a counter clockwise direction to the position shown in full lines in FIG. 11, the disc crank 148 operates upon the pin 146 so that the pin drives the rod 141 to the position of the rod shown in solid lines in FIG. 11. This position of the rod 141 corresponds to the position shown in FIG. 9. As will be seen, the left end of the rod 141 moves in the slot 142 to attain the position shown in FIG. 11. In this position, the pinch roller 54 abuts the capstan 92 to obtain a movement of the tapes 10 and 12 and a transfer to the slave tape 12 of the image on the master tape 10.

As the disc crank 148 continues to rotate counter clockwise from the position shown in FIG. 11 to a position 146a in which the pin 146 is diametrically opposite the position shown in FIG. 11, the rod 141 moves rearwardly in the slot 142 relative to the pin 144 to the position shown in broken lines in FIG. 11. The arrangement shown in FIGS. 11 and 12 is then in a position for the pinch roller assembly to move from the first position shown in FIG. 9 to the second position shown in FIG. 10 when the disc crank 148 and the pin 146 move from the position 146a in FIG. 11 to the position shown in FIG. 12.

Figure 13:
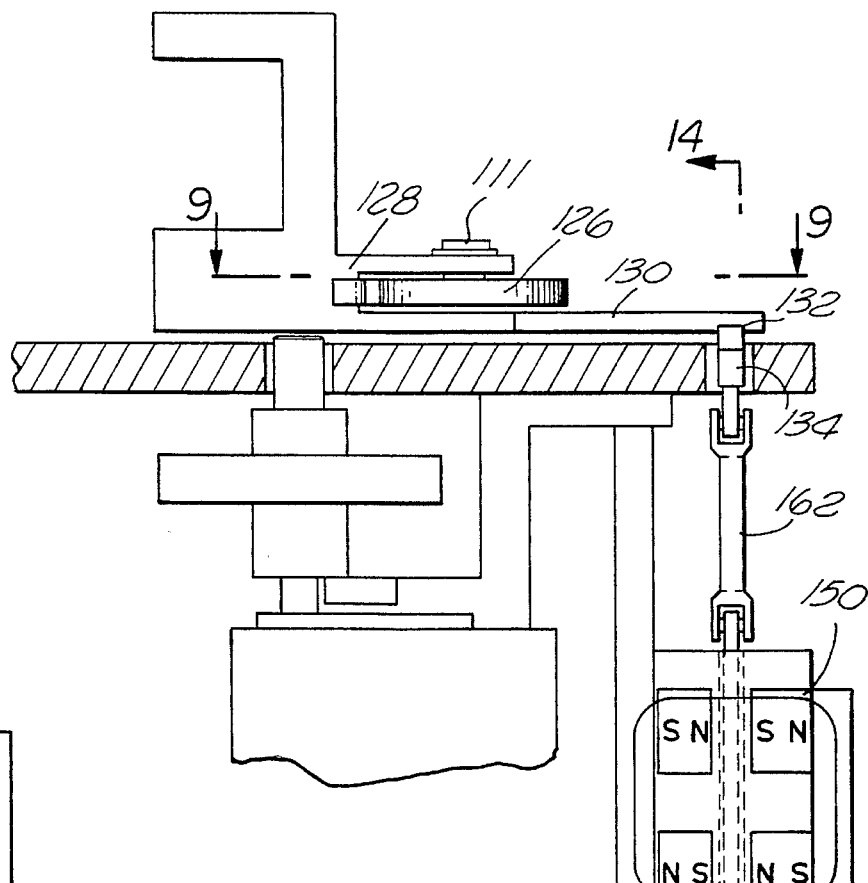
FIG. 13 is an enlarged fragmentary elevational view, partially in section, of apparatus for providing a locking of the pinch roller and the associated guide in the first position and for releasing the pinch roller and the associated guide for movement to the second position.

The actuator 140 shown in block form in FIG. 8 is presented in some detail in FIGS. 13 and 14. The actuator 140 includes a plurality of permanent magnets 150 each having north and south poles as indicated by the letter "N" for north and "S" for south in FIG. 13. A plurality of printed circuit cards 152 are disposed between the opposite pairs of permanent magnets 150. Each of the circuit cards 152 may be formed from a suitable insulating material such as "Kapton". A printed circuit 154 is disposed on the face of each card 152. The printed circuit on one face of each card is inverted relative to the printed circuit on the other face of each card. The printed circuits on the opposite faces of each card are joined at their centers by a lead 156 and by a via 158 extending through a hole in the center of the card. Terminals 160 are disposed at the same extremity on the opposite surfaces of each card. The cards 152 are disposed in a stacked relationship with the terminal 160 on one of the faces of each card soldered to the terminal 160 on the opposite contiguous face of the adjacent card. Many cards may be stacked laminated together, and connected electrically in this manner.

By stacking and interconnecting a plurality of circuit cards 152 in the manner discussed in the previous paragraph, a strong magnetic field is produced by the current flowing through the printed circuits 154 on each card. This magnetic field is in a direction perpendicular to the magnetic field produced by the permanent magnets 150. This causes a force to be produced on the cards in a direction perpendicular to the two (2) magnetic fields. This perpendicular direction is downward in FIGS. 13 and 14. An actuating rod 162 is accordingly moved downwardly in FIGS. 13 and 14 to move the pawl 132 from the position shown in solid lines in FIG. 14 to the position shown in broken lines in FIG. 14. This releases the rod 130 and the pinch roller assembly to move from the first position shown in FIG. 9 to the second position shown in FIG. 10.

Figure 15:
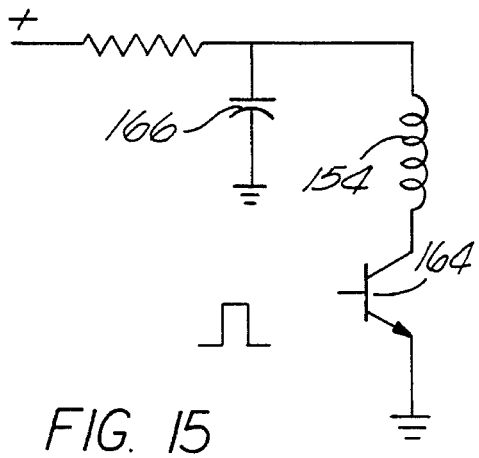
FIG. 15 is a schematic electrical circuit diagram of the circuitry for actuating the apparatus shown in FIGS. 13 and 14 from the locking position to the released position.

FIG. 15 shows a circuit for energizing the printed circuits 154. The printed circuits 154 are shown as a coil in FIG. 15. When the infra-red detector 122 (FIG. 1) produces a signal near the end of the slave tape 12 (actually the beginning of the movie), this signal is introduced to the gate of a transistor 164 which may be a CMOS transistor of the n-type. This signal causes the transistor 164 to become conductive and current to flow through a circuit including a charged capacitance 166, the printed circuits 154 and the transistor 164. The rod 130 and the pinch roller assembly are accordingly moved from the position shown in FIG. 9 to the position shown in FIG. 10.

The slave tape 12 is driven through a path similar to that of the master tape 10. For example, the slave tape 12 is compensated in tension for eccentricities in the rotation of the supply reel 22 by compensating apparatus generally indicated at 170 in FIG. 1 and corresponding in construction to that of the compensating apparatus 46 for the master tape. The tension of the slave tape 12 is also regulated by a guide generally indicated at 172 in FIG. 1 and corresponding in construction and operation to the guide 52 for the master tape. The guide 172 is disposed close to the capstan 92.

A heater generally indicated at 174 is disposed between the guide 172 and the capstan 92 in contiguous relationship to the capstan. The heater 174 may be constructed in a manner similar to that disclosed and claimed in application Ser. No. 07/733,174. The heater 174 heats the thermomagnetic layer on the slave tape 12 to a temperature above the Curie temperature to erase any image on the slave tape. The heating above the Curie temperature does not extend to the backing layer on the slave tape 12. When the thermomagnetic layer on the slave tape 12 contacts the master tape 10, the master tape cools the thermomagnetic layer on the slave tape to a temperature below the Curie temperature and transfers to the slave tape a mirror of the image on the master tape.

FIGS. 19 and 20 illustrate another embodiment of the invention. In this embodiment, the slave tape is not thermomagnetic. However, the master tape 180 has a considerably greater coercivity than the slave tape 182. This is illustrated by two (2) B–H curves each indicating applied magnetic field intensity along the horizontal axis and magnetic flux density along the vertical axis. The coercivity curve for the master tape 180 is illustrated at 184 in FIG. 21 and the B–H curve for the slave tape 182 is illustrated at 186 in FIG. 21.

In the embodiment shown in FIGS. 19 and 20, a hollow capstan 188 is formed from a non-magnetic and insulating material such as a ceramic. The capstan 188 is provided with a thin wall 190 at a position adjacent the pinch roller 54. A magnetic head 192 constructed in a conventional manner is disposed in the hollow interior of the capstan 92 and is provided with a magnetic gap 194 facing the pinch roller 54. The disposition of the head 192 inside the hollow capstan 188 is facilitated by making the capstan integral with the shaft for the capstan motor 93 (FIG. 1).

The magnetic head 192 receives a constant amplitude alternating signal 198 (shown in broken lines in FIG. 21) at a relatively high frequency. The constant amplitude signal 198 results in a progressively increasing field 196 (shown in solid lines in FIG. 21) at each point of the two tapes as they move toward the head gap and then a progressively decreasing field as each of the two tapes move away from the gap. The maximum signal intensity must be greater than the coercivity of the slave tape and less than that of the master tape. The decreasing field from the head in the presence of the field from the master tape results in a mirror image of the magnetic pattern on the master tape to be copied onto the slave tape.

The apparatus shown in the drawings and described above has certain important advantages. It provides for a quick stop after the image such as a movie on the master tape 10 has been transferred to the slave tape 12. Since this is actually at the beginning of the movie, it is desirable to stop the slave tape 10 as quickly as possible. This is desirable so that the amount of the slave tape 12 leading to the beginning of the movie is relatively short. The length of the slave tape 12 from the leader to the pinch roller is almost exactly the same as the length from the leader to the headwheel of a VCR. The apparatus accomplishes this by moving the pinch roller 52 out of engagement with the capstan 92.

The apparatus constituting this invention also compensates for eccentricities in the rotation of the master tape 10 on the supply reel 16 and the rotation of the slave tape 12 on the supply reel 22. The apparatus providing such compensation regulates the tensions of the master tape 10 and the slave tape 12 to overcome the variations in the tape tensions resulting from the eccentricities in the rotations of the supply reels 16 and 22.

The apparatus constituting this invention further provides an embodiment for transferring the image on the master tape 10 to the slave tape 12 by providing the master tape with a relatively large coercivity and the slave tape 12 with a relatively low coercivity. In this embodiment, the capstan 188 is hollow and non-magnetic and non-conducting and the magnetic head 192 is disposed in the capstan 188. An alternating signal applied to the head 192 produces a magnetic field for erasing any image on the slave tape 12 before the image on the master tape 10 is transferred to the slave tape.

It should be appreciated that the pinch roller and the capstan 92 may be interchanged. In this case, the pinch roller 54 would drive the slave tape 12 and the capstan 92 would drive the master tape. Although the words "pinch roller and capstan" are used in the claims, the doctrine of functional equivalence should apply if an infringing system uses the pinch roller 54 to drive the slave tape 12 and the capstan 92 to drive the master tape 10.

Although this invention has been disclosed and illustrated with reference to particular embodiments, the principles involved are susceptible for use in numerous other embodiments which will be apparent to persons skilled in the art.

The invention is, therefore, to be limited only as indicated by the scope of the appended claims.

We claim:

1. In combination for use in a system for transferring to a slave tape the image on a master tape, a first reel for holding the master tape, a second reel for holding the slave tape, the first reel being eccentric to produce variations in the tension of the master tape in accordance with such eccentricities during the rotation of the first reel, the second reel being eccentric to produce variations in the tension of the slave tape in accordance with such eccentricities during the rotation of the slave reel, first means for producing variations in the tension in the master tape to compensate for the variations in the eccentricities of the first reel during the rotation of the first reel, and second means for producing variations in the tension in the slave tape to compensate for the variations in the eccentricities of the second reel during the rotation of the second reel, the first means including a first leaf spring for receiving the master tape at first positions on its periphery and further including first support means having energy absorbing properties and pre-stressed to provide an energy absorbing force on the first leaf spring during a movement of the master tape from a start-up position of the master tape, and the second means including a second leaf spring for receiving the slave tape at first positions on its periphery without contacting the slave tape at a position spaced and isolated on the second leaf spring from such first positions and further including second support means having energy absorbing properties and pre-stressed to provide an energy absorbing force on the second spring during a movement of the slave tape from a start-up position on the slave tape, each of the first and second means having first and second support surfaces, third means disposed against the first surface of the first means for providing an energy absorbing force on the first means and the first spring in a first direction, fourth means disposed against the second surface of the first means at a position opposite the first surface of the first means for providing an energy absorbing force on the first means and the first spring in a second direction opposite to the first direction, the third and fourth means being respectively disposed against the first and second surfaces of the first means to pre-stress the first means to a first particular value, fifth means disposed against the first surface of the second means for providing an energy absorbing force on the second means and the second spring in a first direction, sixth means disposed against the second surface of the second means at a position opposite the first surface of the second means for providing an energy absorbing force on the second means and the second spring in a second direction opposite to the first direction, the fifth and sixth means being respectively disposed against the first and second surfaces of the second means to pre-stress the second support means to a second particular value.

2. In combination for use in a system for transfer to a slave tape the image on a master tape, a first reel rotatable in a pattern providing eccentricities in its rotation, a second reel rotatable in a pattern providing eccentricities in its rotation, a pinch roller having a periphery for receiving the master tape from the first reel, a capstan having a periphery for receiving the slave tape from the second reel, the pinch roller and the capstan being disposed with their peripheries in abutting relationship to provide for a transfer of the image on the master tape to the slave tape;

first means disposed between the first reel and the pinch roller for providing damped variations in the tension of the master tape to compensate for variations in the tension of the master tape as a result of the eccentricities in the rotation of the first reel, and second means disposed between the second reel and the capstan for providing damped variations in the tension of the slave tape to compensate for variations in the tension of the slave tape as a result of the eccentricities in the rotation of the second reel, the first means including a first spring and also including third means disposed against the first spring and constructed to provide a damping compliance with changes in the tension of the master tape as a result of the eccentricities in the rotation of the first reel, the master tape being disposed on the first spring for movement along the first spring, the second means including a second spring and also including fourth means disposed against the second spring and constructed to provide a damping compliance with changes produced in the tension of the slave tape as a result of the eccentricities in the rotation of the second reel, the slave tape being disposed on the second spring for movement along the second spring, the third means including first and second members made from a damping material and supported by the first spring on opposite sides of the first spring and pre-stressed against the first spring, the fourth means including third and fourth members made from the damping material and supported by the second spring on opposite sides of the second spring and pre-stressed against the second spring.

3. In a combination as recited in claim 2, a fifth member extending from the position of support of the first and second members on the first spring to a position on the first spring near the end of the first spring to stiffen the first spring and to provide for the damped compliance in the first and second members with the changes in the tension of the first spring as a result of the eccentricities in the rotation of the first reel, and a sixth member extending from the position of support of the third and fourth members on the second spring to a position on the second spring near the end of the second spring to stiffen the second spring and to provide for the compliance in the third and fourth members with the changes in the tension of the second spring as a result of the eccentricities in the rotation of the second reel.

4. In combination for use in a system for transferring to a slave tape the image on a master tape, a first rotatable reel for holding and supplying the master tape, the first reel having eccentricities affecting the rate of supply of the master tape and thus the tension of the tape during the rotation of the first reel, a second reel for holding and supplying the slave tape, the second reel having eccentricities affecting the rate of supply of the slave tape and thus the tension of the slave tape during the rotation of the second reel, a pinch roller for holding and driving the master tape, a capstan for holding and driving the slave tape, the capstan and the pinch roller being disposed in abutting relationship to provide a transfer to the slave tape of the image on the master tape, first means disposed between the pinch roller and the first reel for compensating in the tension of the master tape for the eccentricities in the first reel during the rotation of the first reel, the first means including a first spring and first damping members attached to the opposite surfaces of the first spring at one end of the first spring to provide damped variations in compliance in accordance with the variations in the tension of the master tape from the eccentricities in the first reel during the rotation of the first reel, second means disposed between the capstan and the second reel for compensating in the tension of the slave tape for the eccentricities in the second reel during the rotation of the second reel, the second means including a second spring and second damping members attached to the opposite surfaces of the second spring at one end of the second spring to provide damped variations in compliance in accordance with the variations in the tension of the slave tape from the eccentricities in the second reel during the rotation of the second reel, third means disposed in contiguous relationship to the pinch roller between the first means and the pinch roller for further regulating the tension of the master tape before the movement of the master tape to the pinch roller, and fourth means disposed in contiguous relationship to the capstan between the second means and the pinch roller for further regulating the tension of the slave tape before the movement of the slave tape to the capstan.

5. In a combination as set forth in claim 4, the first means including a first stiffening member attached to the first spring near the opposite ends of the first spring to provide for the compliance by the first damping members to variations in the tension of the master tape as a result of the eccentricities in the first reel during the rotation of the first reel, the master tape extending over the first spring from the first reel, the second means including a second stiffening member attached to the second spring near the opposite ends of the second spring to provide for the compliance by the second damping members to variations in the tension of the slave tape as a result of the eccentricities in the second reel during the rotation of the second reel, the slave tape extending over the second spring from the second reel.

6. In a combination as set forth in claim 5, the first means including a first pair of stops respectively disposed against individual ones of the first damping members to pre-stress the first damping members and limit the compliance of the first damping members, the second means including a second pair of stops respectively disposed against individual ones of the second damping members to pre-stress the second damping members and limit the compliance of the second damping members.

7. In a combination as set forth in claim 6, the first and second damping members being made from polyurethane.

8. In a combination as set forth in claim 4, fifth means disposed against the first damping members to pre-stress the first damping members and limit the compliance of the first damping members, and sixth means disposed against the second damping members to pre-stress the second damping members and limit the compliance of the second damping members.

9. In combination for use in a system for transferring to a slave tape the image on a master tape, a first cassette including a first supply reel and a first take-up reel for transferring the master tape between the first supply reel and the first take-up reel, a second cassette including a second supply reel and a second take-up reel for transferring the slave tape between the second supply reel and the second take-up reel, the first and second supply reels having eccentricities in their rotations, a pinch roller for receiving the master tape during the movement of the master tape between the first supply and take-up reels, a capstan for receiving the slave tape during the movement of the slave tape between the second supply and take-up reels, the pinch roller and the capstan being disposed in abutting relationship to provide for a transfer to the slave tape of the image on the master first means disposed between the first supply reel and the pinch roller for providing a compensation in the tension on the master tape for the variations in the tension of the master tape from the eccentricities in the rotation of the first supply reel, and second means disposed between the second supply reel and the capstan for providing a compensation in the tension of the slave tape for the variations in the tension of the slave tape from the eccentricities in the rotation of the second supply reel, the first means including a first leaf spring having opposite surfaces for receiving the master tape and further including first energy absorbing means attached to the opposite surfaces of the first leaf spring at corresponding positions at such opposite surface near one end of the first leaf spring for providing a damped variable compliance in accordance with variations in the tension of the master tape as a result of the eccentricities in the rotation of the first supply reel, and the second means including a second leaf spring having opposite surfaces for receiving the slave tape and further including second energy absorbing means attached to the opposite surfaces of the second leaf spring at corresponding positions at such opposite surfaces near one end of the second leaf spring for providing a damped variable compliance in accordance with variations in the tension of the slave tape as a result of the eccentricities in the rotation of the second supply reel.

10. In a combination as set forth in claim 9, the first means including means for pre-stressing the first energy absorbing means and for limiting the variable compliance of the first energy absorbing means in accordance with the variations in the tension of the master tape as a result of the eccentricities in the rotation of the first supply reel, and the second means including means for pre-stressing the second energy absorbing means and for limiting the variable compliance of the second energy absorbing means in accordance with the variations in the tension of the slave tape as a result of the eccentricities in the rotation of the second supply reel.

11. In combination for use in a system for transferring to a slave tape the image on a master tape, a first cassette including a first supply reel and a first take-up reel for transferring the master tape between the first supply reel and the first take-up reel, a second cassette including a second supply reel and a second take-up reel for transferring the slave tape between the second supply reel and the second take-up reel, the first and second supply reels having eccentricities in their rotations, a pinch roller for receiving the master tape during the movement of the master tape between the first supply and takeup reels, a capstan for receiving the slave tape during the movement of the slave tape between the second supply and takeup reels, the pinch roller and the capstan being disposed in abutting relationship to provide for a transfer to the slave tape of the image on the master tape, first means disposed between the first supply reel and the pinch roller for providing a compensation in the tension on the master tape for the variations in the tension of the master tape from the eccentricities in the rotation of the first supply reel, and second means disposed between the second supply reel and the capstan for providing a compensation in the tension of the slave tape for the variations in the tension of the slave tape from the eccentricities in the rotation of the second supply reel, the first means including a first leaf spring for receiving the master tape and further including first damping means attached to the first leaf spring at one end of the first leaf spring for providing a damped variable compliance in accordance with variations in the tension of the master tape as a result of the eccentricities in the rotation of the first supply reel, and the second means including a second leaf spring for receiving the slave tape and further including second damping means attached to the second leaf spring at one end of the second leaf spring for providing a damped variable compliance in accordance with variations in the tension of the slave tape as a result of the eccentricities in the rotation of the second supply reel, the first means including means for pre-stressing the first damping means and for limiting the damped variable compliance of the first damping means in accordance with the variations in the tension of the master tape as a result of the eccentricities in the rotation of the first supply reel, and the second means including means for pre-stressing the second damping means and for limiting the damped variable compliance of the second damping means in accordance with the variations in the tension of the slave tape as a result of the eccentricities in the rotation of the second supply reel, a first stiffening member attached to the first leaf spring near the opposite ends of the first leaf spring to provide for the compliance of the first damping means to the variations in the tension of the master tape as a result of the eccentricities in the rotation of the first supply reel, and a second stiffening member attached to the second leaf spring near the opposite ends of the second leaf spring to provide for the compliance of the second damping means to the variations in the tension of the slave tape as a result of the eccentricities in the rotation of the second supply reel.

* * * * *